United States Patent
Cia et al.

[11] Patent Number: 5,431,088
[45] Date of Patent: Jul. 11, 1995

[54] AUTOMATIC MACHINES DISPENSING COFFEE INFUSIONS

[75] Inventors: Antonio M. Cia; Juan I. C. Andueza, both of Aizoain, Spain

[73] Assignee: Azkoyen Hosteleria, S.A., Aizoain, Spain

[21] Appl. No.: 168,657

[22] Filed: Dec. 16, 1993

[30] Foreign Application Priority Data

Dec. 23, 1992 [ES] Spain ................................ 9202605

[51] Int. Cl.⁶ ............................................. A47J 31/34
[52] U.S. Cl. ................................ 99/287; 99/289 R; 99/291; 99/302 P
[58] Field of Search .............. 99/279, 289 R, 289 D, 99/289 P, 287, 298, 297, 295, 291, 300, 302 R, 302 P, 316, 317, 318, 319; 426/433; 221/135

[56] References Cited

U.S. PATENT DOCUMENTS

| | | | |
|---|---|---|---|
| 4,421,014 | 12/1983 | Vicker | 99/289 P |
| 4,602,558 | 7/1986 | Kaper | 99/287 |
| 4,796,521 | 1/1989 | Grossi | 99/289 R |
| 4,941,399 | 7/1990 | Zucchetti | 99/289 P |
| 5,103,716 | 4/1992 | Mikkelsen | 99/289 R |
| 5,277,102 | 1/1994 | Martinez | 99/287 |

FOREIGN PATENT DOCUMENTS 1338260 10/1963 France ................. 99/289 P

Primary Examiner—Robert W. Jenkins
Attorney, Agent, or Firm—Helfgott & Karas

[57] ABSTRACT

The machine is paired as concerns the receptacle (8-8') for the batched coffee and the piston (5) and (5') pressing such batches, and the ejector (12-12') in such a way that the pairing allows the machine to make one or two coffees at the same time and indeed three if one of the receptacles (8) or (8') has a double capacity and a double distribution outlet. Each seat or support (4) mounted also to turn with the main shaft (1) has a cavity in which a support (18) is positioned for a filter (19) through which the coffee infusion passes in each case. The angular separation in positioning the receptacles (8-8') is the same as for the pressing pistons (5-5') in order to allow the same to face the receptacles (8-8') simultaneously, the ejectors (12-12') for the cake (13) of used coffee being mounted with the same separation or spacing.

3 Claims, 4 Drawing Sheets

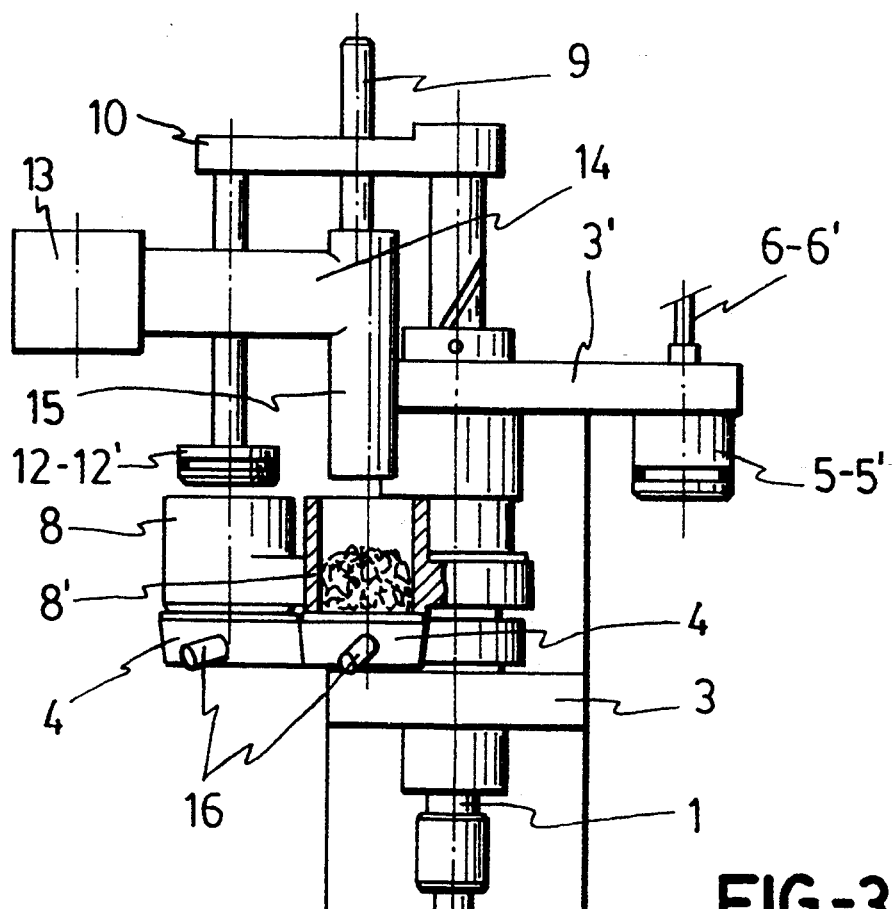
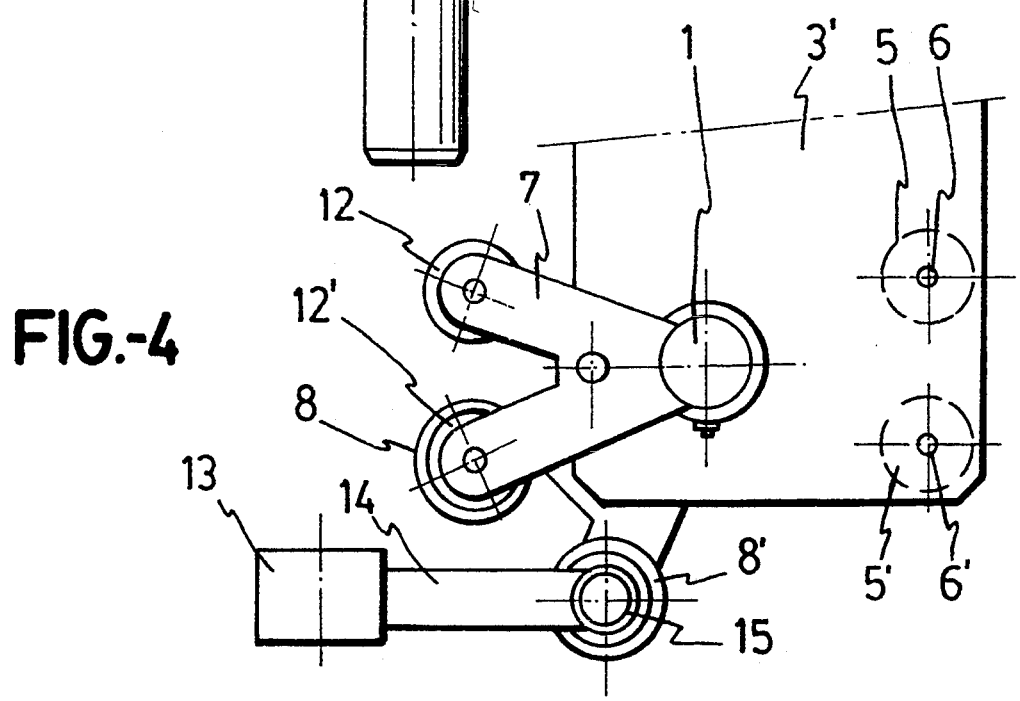

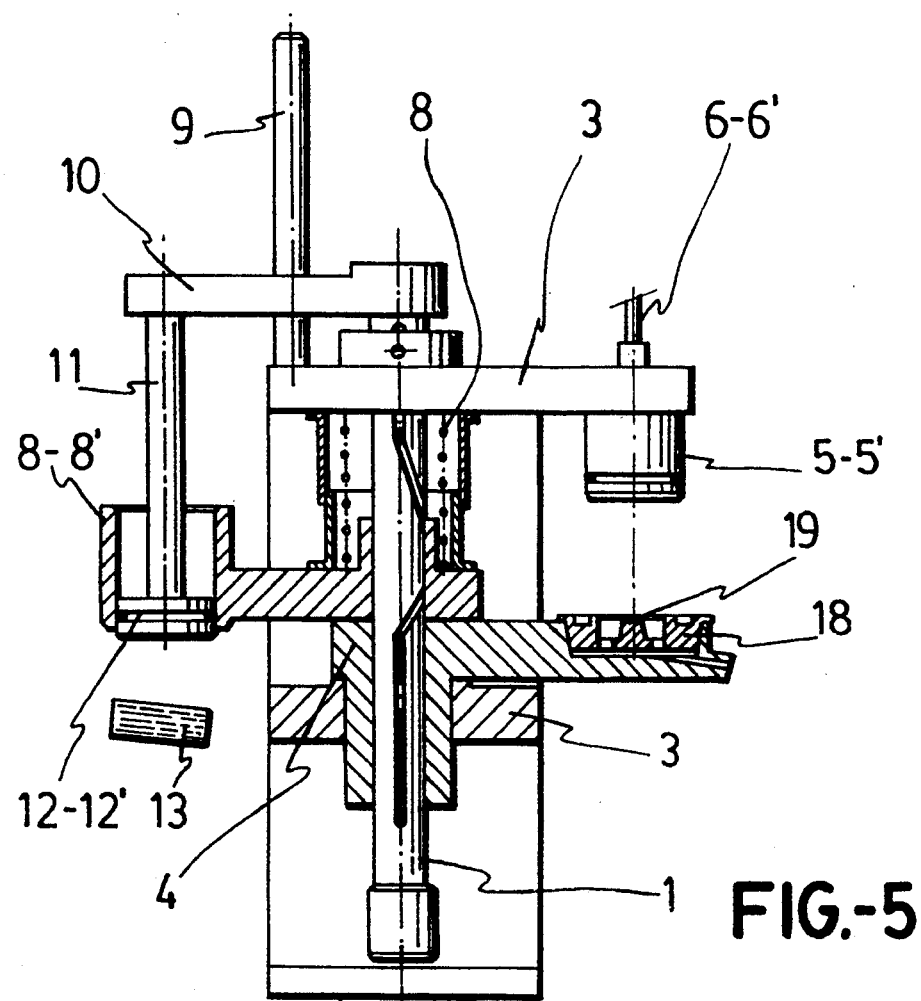
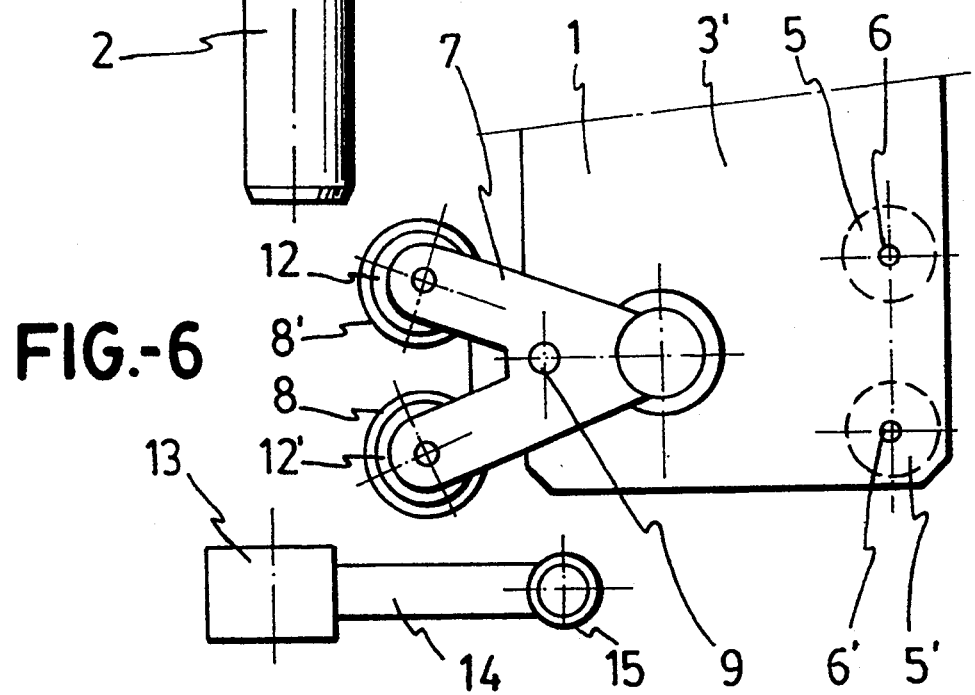

AUTOMATIC MACHINES DISPENSING COFFEE INFUSIONS

OBJECT OF THE INVENTION

The present invention relates to improvements to automatic machines dispensing coffee infusions, which improvements allow the machine to be able to make one, two or three coffee infusions at the same time.

The machine relies on a shaft that moves vertically driven by a cylinder, causing the members positively engaged therewith to turn when it moves, and is fitted with paired members that allow several coffees to be obtained per cycle.

BACKGROUND OF THE INVENTION

Main Spanish patent of invention 9101161 and Spanish certificate of addition 9200950, as yet unpublished, describe a machine based on a shaft that can move up and down driven by a cylinder mounted upon a fixed support working as a guide. The said support contains on the upper portion a vertical piston that presses the hatched coffee. The receptacle holding the batched coffee and whose bottom is positively engaged with the said shaft, and turning simultaneously with the vertical movement of the shaft, is mounted radially to same.

The said receptacle takes up three positions along the cycle:
- A coffee load position, when it receives the batched coffee.
- Distribution position, where it faces the shaft and the cake is compressed, and water then distributed onto the same, to obtain the infusion.
- Unload position at which an ejector element positively engaged with the shaft, and upon the downward movement thereof, enters the receptacle and pushes the cake downwards, once the receptacle bottom has cleared the way.

The machine is moreover provided with a system preventing the movable parts from being soiled in order to avoid any obstruction whatsoever. It is also fitted with a washing operation for the receptacle and its base.

DESCRIPTION OF THE INVENTION

The improvements subject hereof are designed for the machine referred to above to provide one, two or three coffee infusions at the same time (in the same cycle), relying on a pairing of certain members:
- Two receptacles of different diameters located radially to the shaft, and provided to contain one batch or two batches of coffee, respectively, with their bases positively engaged with the shaft.
- Two pistons of different diameter positioned vertically on the upper portion of the fixed support guiding the shaft, and designed to press the coffee contained in the receptacles and through which the distribution water passes.
- Two cylindrical ejector elements to push the cakes of used coffee downwards.

Another of the improvements comprises having the receptacle bases, positively engaged with the shaft, housing removable shower carriers for an easier cleaning thereof.

DESCRIPTION OF THE DRAWINGS

In order to provide a fuller description and contribute to the complete understanding of the characteristics of this invention, a set of drawings is attached to the specification which, while purely illustrative and not fully comprehensive, shows the following:

FIGS. 3 and 4 are two views of the same machine shown in the above figures, the position being that at which one of the receptacles receives the batched coffee from the mill.

FIGS. 5 and 6 are two side elevation and plan views in part cross-section of the same machine shown in the above figures, the position being that at which the cake of used coffee is expelled.

PREFERRED EMBODIMENT OF THE INVENTION

Figure 1:
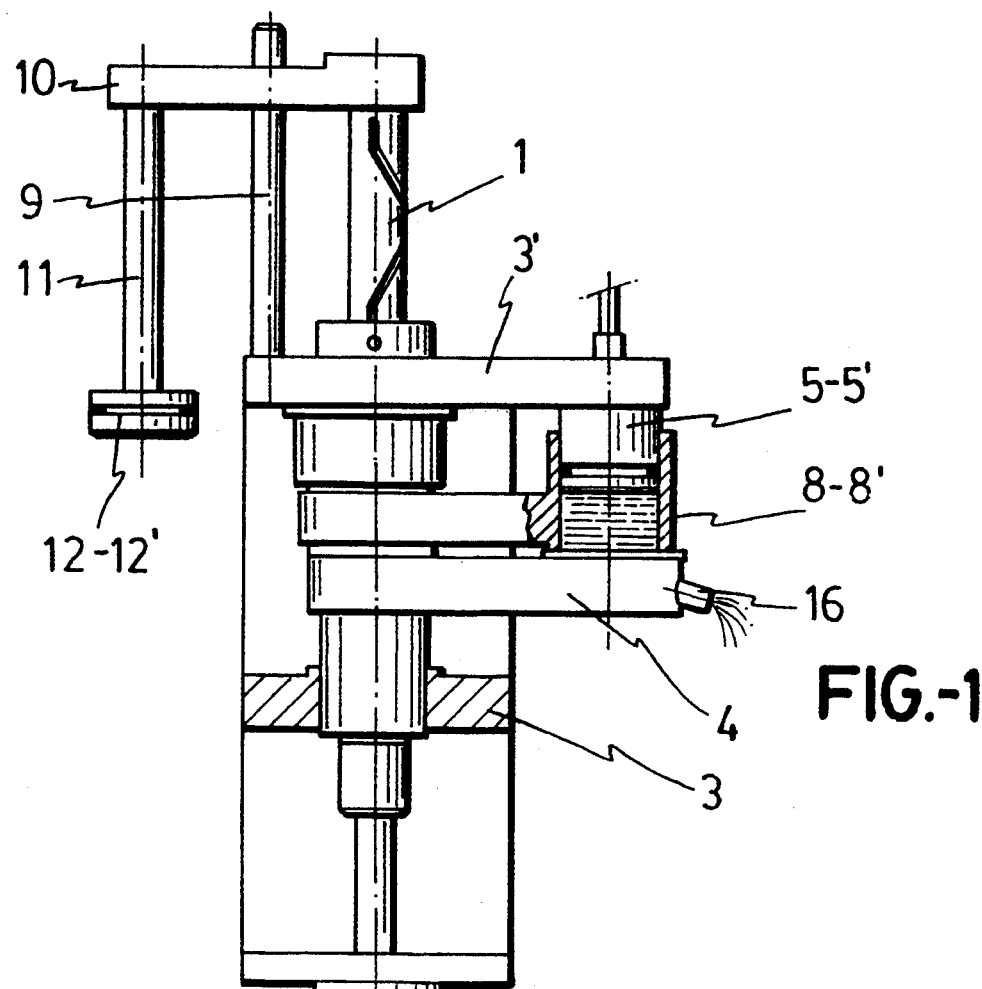
FIGS. 1 and 2 are two diagrammatic side elevation and plan views of the machine made in accordance with the improvements subject of the invention, in particular showing the pairing of the ejector elements, the batched coffee receptacles (carriers) and pistons. The position shown in this figure is the position where the infusion the machine yields is distributed.

The figures show that the machine of the invention basically comprises a shaft (1) mounted upon a fixed support (3) and moving vertically driven by a cylinder (2).

The fixed support, namely its upper portion (3), is fitted with two pistons (5—5') of different diameter containing the showers through which water is poured onto the coffee. Mounted on the shaft (1) and radially thereto are the carriers (8—8') the bases (4) of which, positively engaged with the said shaft, their lower portion lying upon the support (3), is fitted with the relevant filters (19) and seals (21).

A support (10) is positively engaged at the upper shaft portion containing two ejector elements (12—12') of different diameter.

Figure 2:
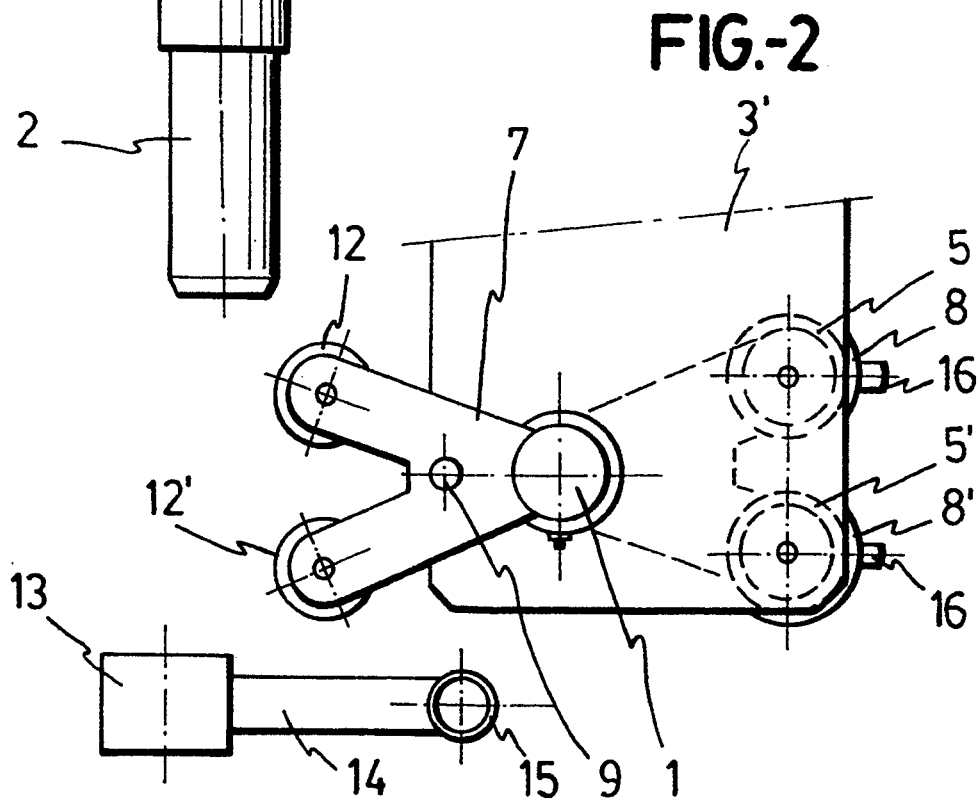
Figure 7:
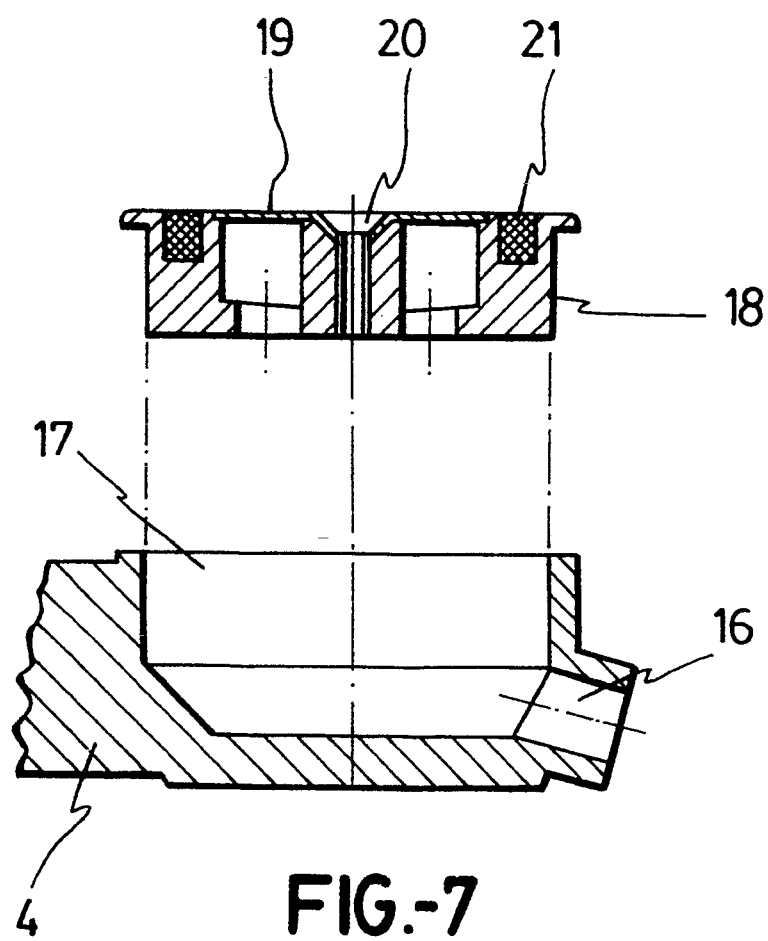
FIG. 7 is finally a cross-section of the support or movable seat making up the bottom of the hatched coffee receptacle, which support or seat shall house a filter carrying element, a cross-section of which is also shown, representing another of the improvements of the invention.

The two carriers (8—8') and their bases (4) accompany the shaft in its upward-downward movement, turning at the same time on a horizontal plane to reach the aforesaid three positions:
- Load position (FIGS. 3 and 4) with each carrier arriving in succession under the duct (15) through which the hatched coffee drops (one or two coffees, depending on the carrier positioned below the same).
- Distribution position (FIGS. 1 and 2) at which the two carriers are arranged facing their respective pistons (5-5') in order for the coffee to be compressed and the water distributed through the same, leaving through the outlet (16) to the cups.
- Unload position; when distribution is over, the carriers turn until they arrive under the ejectors (12—12') that, on moving down, push the cake or cakes (13) towards the waste collection box, when detached from the bottom (4).

The ends of the carrier bases (4) have a cavity which houses a removable element (18) containing a filter (19) and a seal (21).

The machine is also fitted with a protection system that prevents the soiling of the movable carriers, as described in Spanish patent 9101161 and Spanish certificate of addition 9200950 thereof.

Finally, the machine is logically governed by an electronic control that, among other functions, allows selection of whether one, two or three coffees will be simultaneously required in the same cycle, respectively hatching the ground coffee into the one-coffee carrier, the two-coffees carriers or both.

We claim:

1. An automatic machine for dispensing coffee infusions, wherein the machine comprises a main shaft; a support means for guiding the main shaft; first and second receptacles; first and second pistons attached to said support means for pressing coffee batches housed in the first and second receptacles, each of said first and second pistons having an arm, wherein the arms are positioned at an angle to each other and have a common respective mounting and turning bushing at the main shaft, the machine further comprising a pair of ejectors comprising two pistons for ejecting a relevant cake or mass of coffee, wherein the automatic machine is able, in a single cycle, to make up to three coffee infusions at one time.

2. An automatic machine for dispensing coffee infusions, as in claim 1, wherein the angle of separation of the arms of the pistons for pressing the batched coffee at the main shaft matches an angle of separation of both the first and second receptacles and the pair of ejectors at said main shaft.

3. An automatic machine for dispensing coffee infusions, as in claim 1, further comprising a double seat or base mounted radially to positively engage with said main shaft, the double seat or base being fitted with a third receptacle for positioning a removable support carrying a filter, the filter being attached to the removable support by a screw and an elastic seal for providing a tight fit between the removable support and the third receptacle.

* * * * *